(No Model.)
J. MORROW.
SADDLE PAD.
No. 383,821. Patented May 29, 1888.
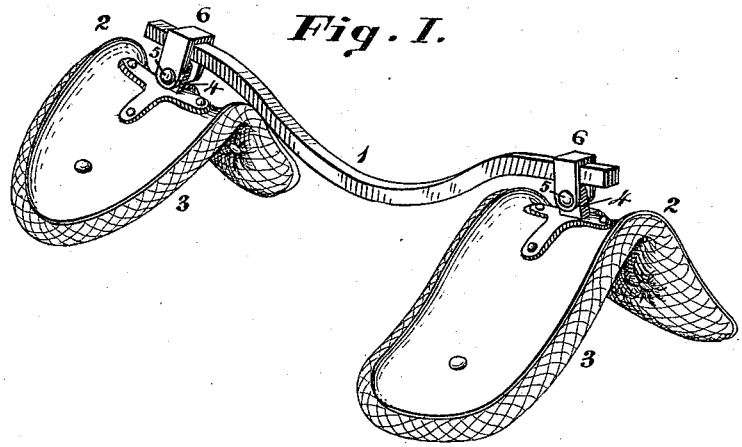
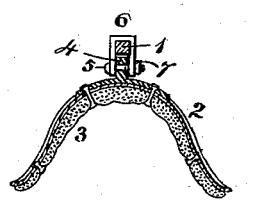
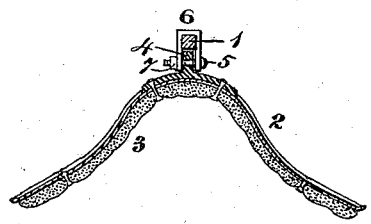
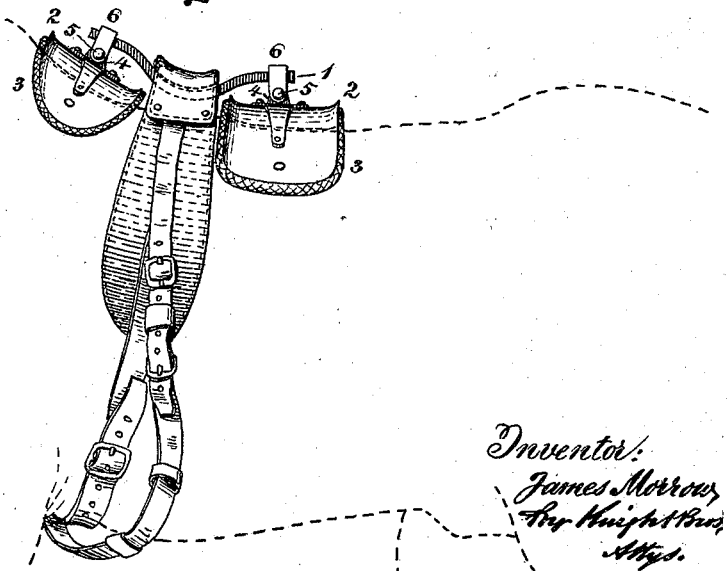
Attest:
Geo. H. Knight
E. Arthur
Inventor:
James Morrow,
By Knight Bros,
Attys.

UNITED STATES PATENT OFFICE.

JAMES MORROW, OF WASHINGTON COURT-HOUSE, OHIO, ASSIGNOR TO THE MORROW BROS. MANUFACTURING COMPANY, OF SAME PLACE.

SADDLE-PAD.

SPECIFICATION forming part of Letters Patent No. 383,821, dated May 29, 1888.

Application filed January 11, 1888. Serial No. 260,415. (No model.)

*To all whom it may concern:*

Be it known that I, JAMES MORROW, of Washington Court-House, Fayette county, Ohio, have invented a new and useful Improvement in Saddle-Pads, of which the following is a specification.

My invention relates to a device for relieving a galled or chafed back of a draft-animal from contact with the saddle.

My present invention consists in the manner of connecting the two pads, the other features being in common with my improvement in horse-collar pads, for which a United States patent, No. 369,650, was granted on the 6th day of September, 1887, to which reference may be made for description of details common to both.

In the accompanying drawings, Figure I is a perspective view of a saddle-pad illustrating my invention. Figs. II and III are vertical transverse sections of the front and rear bearing-plates, respectively. Fig. IV shows one of my pads applied to a saddle.

1 is a steel rod or bar bent downward, as represented, at or about its mid-length, and which I designate the "supporting-bar," the bar being bent to bring it in a position close to the back of the animal to admit of the ready placing of the ordinary saddle thereon, and also to prevent the plates from working toward the center of the bar by accidental loosening of their connections, and thereby agitating the galled or chafed part of the back.

2 represent two saddle-formed pieces of sheet-steel, constituting my elastic bearing-plates. These plates, if properly shaped, may be used without covering, but are preferably lined or padded on their under surfaces, as at 3. Each bearing-plate is so formed as to conform to the animal's back at the point at which it is applied.

Extending vertically from the center of the crown or back of each bearing-plate is a rigid ear, 4, which is secured by a bolt or rigid screw-threaded pintle, 5, to a clip, 6, that embraces the supporting-bar, and extends downward therefrom, so as to constitute an adjustable hinge attachment of said bearing-plate to said supporting-bar, which, while upholding said bar the proper distance above the bearing-plate, permits free vibration of such plate in the plane of the bar about a center of oscillation midway between said bar and plate, the lips of the latter being at the same time at liberty to conform to the animal's shape and movements. A nut, 7, on each pintle 5 enables the bearing-plates to be fastened at any desired distance apart on the supporting-bar.

The application of my pad is plainly indicated in Fig. IV. The bearing-plates having been adjusted and secured at their proper distance apart, the pad is placed in position upon the animal's back, whereupon the saddle is placed in the depression of the supporting-bar and secured to the animal in the customary way.

I claim as new and of my invention—

1. The combination, with the flexible bearing plates or pads, of a downwardly-curved supporting-bar, as set forth.

2. The combination, with the flexible bearing plates or pads, of a downwardly-curved rigid supporting-bar having adjustable hinged connections with said bearing-plates, as set forth.

In testimony of which invention I hereunto set my hand.

JAMES MORROW.

Attest:
HERMAN RICE,
W. H. DIAL.